INVENTORS
CLARENCE R. WUELLNER
GEORGE E. KELLOGG
BY D. C. Staley
THEIR ATTORNEY

United States Patent Office 3,172,334
Patented Mar. 9, 1965

3,172,334
POWER BRAKE BOOSTER
Clarence R. Wuellner, Dayton, and George E. Kellogg, Miamisburg, Ohio, assignors to General Motors Corporation, Detroit, Mich., a corporation of Delaware
Filed Apr. 9, 1958, Ser. No. 727,401
1 Claim. (Cl. 91—369)

This invention relates to power brake units for motor vehicles and particularly to brake booster mechanisms incorporating "feel" of application of the brake.

It is desirable in power brake booster mechanisms to provide a structure by which there is an apparent feel of the degree of application of the brakes of the vehicle that the operator may have more accurate control over the brake effort applied to the vehicle, and thereby the rate of deceleration of the vehicle. To accomplish this, it has become the general practice to utilize the hydraulic pressure developed in the master cylinder during a brake application for application to a member that transmits pressure to a manually operated element that is under the control of the operator of the vehicle and feel the pressure developing in the master cylinder and thereby have a sense of feeling of the brake effort applied to the wheels of the vehicle. The amount of "feel" that is transmitted from the master cylinder to the foot of the operator through the reaction system of the power brake unit is only a small portion of the total brake effort applied at the wheels of the vehicle.

Numerous reaction system have been proposed in the prior art by which the operator of the vehicle is given a sense of feeling the full power of the brake application some of which have used hydraulically operated plungers that have their area proportioned to the area of the brake fluid displacement member that operates in the master cylinder so as to provide a proportionate brake "feel" while others have used diaphragms with opposite sides exposed to pressure differentials to obtain the desired brake "feel" and still others have utilized mechanical lever components to obtain a proportioned brake feel to the foot of the operator of the vehicle.

It is an important object of the present invention to provide a novel type brake booster mechanism wherein a body of deformable material is provided to receive reaction pressure from the master cylinder with the deformation of the body transmitting the reaction forces to a manual control member that has a predetermined area exposed to the action of the deformable body so that the reaction forces transmitted to the foot of the operator are proportioned to the reaction forces transmitted from the master cylinder with the result that the brake "feel" is proportioned to the actual brake effort.

A further object of the invention is to provide a power brake booster incorporating brake feel mechanism wherein the reaction forces of the brake booster are transmitted to the pressure responsive unit of a pressure operated motor and to a manually operable member that is actuated by the foot of the operator by means of a deformable force transmitting body that is confined between the force transmitting member of the power booster, the pressure responsive unit or power wall of the booster and the manually operated member that is actuated by the foot of the operator so that the reaction forces transmitted through the power transmitting member are transmitted to the pressure responsive unit of the motor and the manually operated member in a predetermined ratio as determined by the effective areas of the pressure responsive unit and of the manually operated member that are exposed to the action of the deformable force transmitting body. It is also an object of the invention to provide in the power brake booster of the type of this invention incorporating a deformable force transmitting body a mechanism by which the initial reaction forces generated by pressure in the master cylinder are delayed in acting upon the manually operated member so that the operator of the vehicle will be required to exert only sufficient manual effort in the initial actuation of the brake booster to operate the follow-up control valves at least until pressure differentail is created on the power wall of the brake booster, whereafter the reaction forces created by the pressure built up in the master cylinder are transmitted to the power wall or pressure responsive unit of the brake booster and to the manually operated member in a predetermined ratio whereby the operator will have a predetermined brake feel in continued operation of the brake booster.

Still another object of the invention is to provide a power brake booster utilizing a body of deformable plastic material to transmit power from the power wall or pressure responsive unit of the brake booster to the fluid displacing unit that displaces fluid from the master cylinder and utilize the same body of plastically deformable material to transmit reaction forces to the power wall or pressure responsive unit and to the manually operated member in a predetermined ratio to give the operator of the vehicle a predetermined brake feel.

Still another object of the invention is to provide a power brake unit in which there is provided a movable power wall or pressure responsive unit that has a cavity in which there is placed a body of an elastically deformable force transmitting material with one side of the body of material being engaged by a force transmitting member that transmits power to the fluid displacing member in the master cylinder and with the other side of the body engageable with a manually operated member that is under control of the operator of the vehicle whereby upon power actuation of the power wall or pressure responsive unit power movement of the fluid displacing member in the master cylinder will be obtained and reaction forces created in the master cylinder as a result of the pressures built up in the master cylinder will be transmitted to the power wall and the manually operated member in a predetermined ratio to provide a predetermined brake feel to the operator of the vehicle; and it is still a further object to arrange the deformable body relative to the manually operated member that the initial reaction forces are delayed in being received by the pressure responsive unit, or at least the major portion of the initial reaction forces are so delayed; and further to so arrange the deformable body relative to the manually operated member that the manually operated member will be maintained in a predetermined spaced relationship relative to the deformable body by reason of a predetermined degree of deformation of the deformable body so that the manual member will normally be positioned in the off position of the power brake booster with the follow-up valves disposed in condition to provide for balance of pressures on both sides of the power wall.

Further objects and advantages of the present invention will be apparent from the following description, reference being had to the accompanying drawings wherein a preferred form of the invention is clearly shown.

Figure 1:
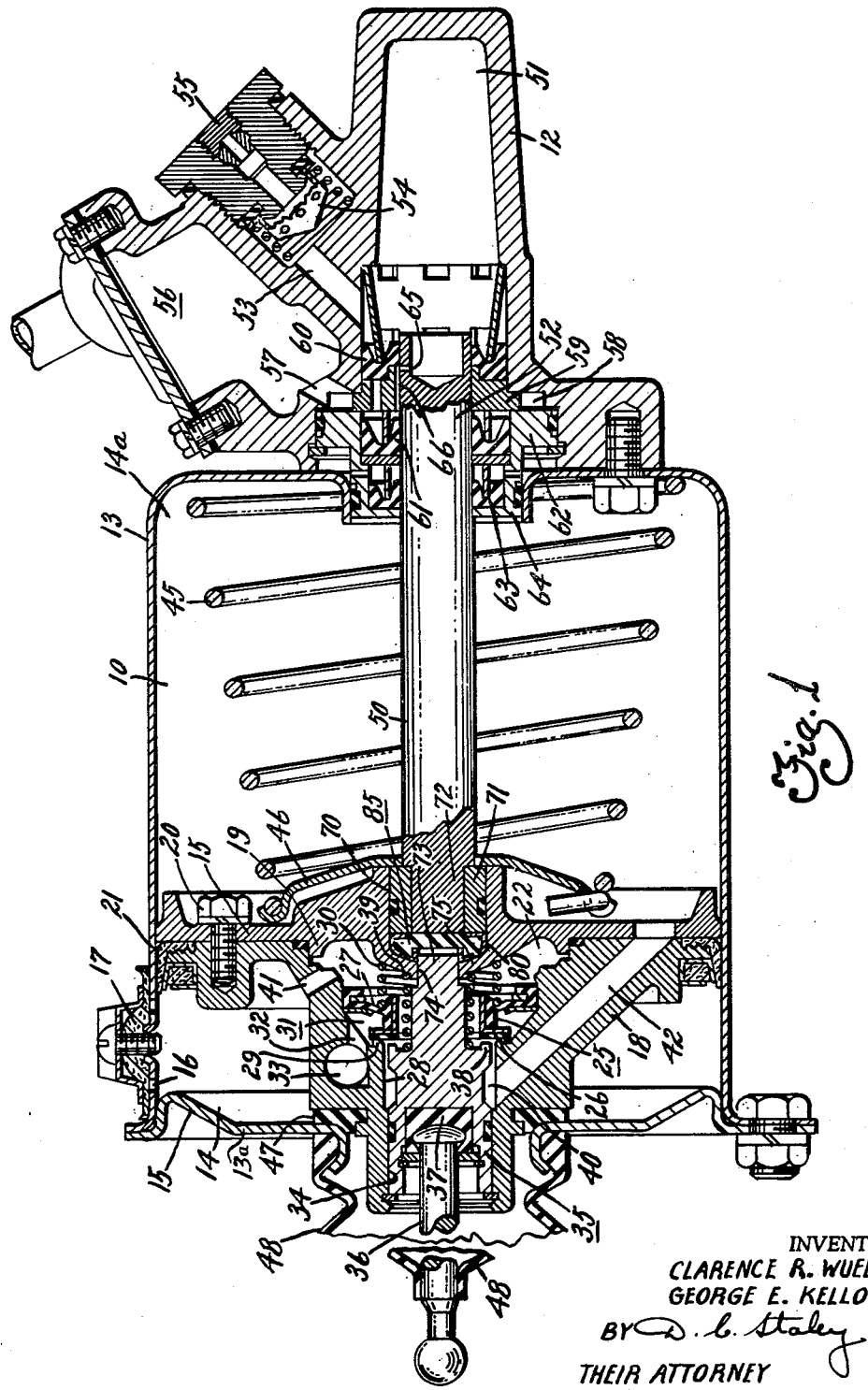
FIGURE 1 is a cross sectional view of a power brake booster unit incorporating features of this invention.

In this invention the power brake booster unit comprises a power unit 10 having a master cylinder 12 attached at one end of the unit. The power unit 10 has a casing 13 in which there is positioned a pressure responsive unit 15 in the form of a piston that forms a power wall dividing the casing 13 into the chambers 14 and 14a. The chamber 14 receives a closure member 13a whereby the casing 13 is established as a complete enclosure. The chamber 14 communicates with the atmosphere through ports 16 and a filter 17.

The power wall 15 is formed of two casting members 18-19 secured together by bolts 20 and provided with a resilient cup seal 21 at the periphery of the casting 18-19.

The casting 18 and 19 establishes a cavity 22 that receives a follow-up control valve 25. The follow-up control valve 25 consists of a valve member 26 supported on a flexible diaphragm 27.

The casting 18 has an axial bore 28 around the forward edge of which there is provided a valve seat 29 on which the valve 26 normally seats as urged by the spring 30. The valve member 26 together with the diaphragm 27 form a chamber 31 that is connected by port 32 with a port 33 which in turn is connected by a flexible line with the manifold of the vehicle so that manifold vacuum continuously stands in the vacuum chamber 31.

The axial bore 28 has a co-extensive bore 34 that receives a manually operated member 35. The manually operated member 35 has a rod 36 connected thereto by the connection 37, the rod 36 being manually operated by the brake lever system of the vehicle that is actuated by the operator of the vehicle. The manually operated member 35 has an annular seat 38 that is coaxial with the annular seat 29 on the casting 18 but is radially inwardly of the seat 29. This annular air seat is normally maintained in a position of disengagment with the valve member 26 by means of the spring 39.

The manual member 35 is smaller in diameter than the axial bore 28 thereby forming an annular chamber 40 around the manual member 35 that normally is in connection with the chamber 20 that in turn is normally connected with the atmosphere chamber 14 by means of port 41. The annular chamber 40 communicates with the right hand side of the power wall 15 through the port 42 so that normally atmospheric air stands in both chambers 14 and 14a when the power unit is in the off position with pressures being balanced in these chambers.

The power wall or pressure responsive unit 15 is held in the position shown in the drawing by means of the return compression spring 45 that engages the casing 13 at one end and engages the disc 46 at the other end which in turn urges the casting member 19 of the wall 15 in a left hand direction. A rubber bumper 47 is provided between the casting member 18 and the cover member 15. A rubber dirt boot 48 encloses the operating rod 36.

The pressure responsive unit 15 carries a power transmitting member 50 that has the right hand end thereof extending into the master cylinder bore 51 whereby this end of the member 50 forms a fluid displacing member 52 for displacement of hydraulic fluid under pressure from the master cylinder 12 through the discharge port 53 and thence through the residual check valve 54 of conventional design to the discharge port 55 with which the brake lines are connected for delivering brake fluid under pressure to the wheel cylinders at the individual wheels of the vehicle.

The master cylinder 12 carries the brake fluid reservoir 56 having a port 57 communicating with the annular chamber 58 around the spacer member 59 that supports a fluid seal 60 on the right hand end. A secondary fluid seal 61 is carried within the member 62 and a vacuum seal 63 carried in the member 64. The fluid displacing member or displacement plunger 52 has a port 65 communicating with a groove 66 in the member 59 so that when the displacement plunger 52 is in the position shown in the drawing, that is the off position of the booster, the reservoir 56 will be connected directly with the master cylinder bore 51. As soon as port 65 moves in a right hand direction past the edge of the spacer 59 and seal 60, communication between the reservoir 56 and the master cylinder bore 51 is cut off so that advancement of the displacement plunger 52 into master cylinder bore 51 generates pressure on the brake fluid in the bore 51 and displaces fluid through the port 55 into the brake lines of the vehicle.

Generation of pressure on the brake fluid in the master cylinder bore 51 creates a reaction pressure on the fluid displacing member 52 in the left hand direction in opposition to the power applied by the power wall 15 to the power transmitting member 50 in a manner now to be described.

The casting member 19 has an axial bore 70 that receives the sleeve 71 carried on the left hand end 72 of the power transmitting member 50 so that the sleeve 71 and the end 72 of the member 50 within the sleeve forms a piston reciprocable in the bore 70.

The manually operated member 35 has a forwardly extending reduced diameter portion 73 that is slidable in a bore 74 provided in the wall 75 at the left hand end of the bore 70. The end 73 of the manual member 35 projects into the bore 70 in coaxial alignment with the power transmitting member 50.

The power transmitting member 50 together with the pressure responsive unit 15 and the extension 73 of the manual member 35 form a closed cavity 80 that receives a deformable body 85 of predetermined volume. The body 85 has an annular cup of plastic material 86 to prevent extrusion of the body into the clearance between the sleeve 71 and the bore 70 when pressure is applied to the body 85 in a manner hereinafter described. Similarly a sleeve 87 of plastic material is provided on the body 85 to prevent extrusion of the body into the clearance between the forward end 73 of the manual member 35 and the bore 74 in which the extension 73 reciprocates, as more particularly shown in the enlarged drawing of FIGURE 2.

As shown in the drawing, the body 85 is illustrated as a preformed rubber member that is elastically deformable when pressure is supplied to the body by relative movement between the power transmitting member 50 and the power wall or pressure responsive unit 15. Compression pressure applied to the body 85 will cause the body to displace its volume so as to effect engagement with the forward end 73 of the manual member 35, and specifically engage the end area 88 of the manually operated member 35 so as to apply pressure against the manually operated member 35 in a left hand direction. This relative movement between the power transmitting member 50 and the pressure responsive unit 15 is caused at a time when pressure differential exists on both sides of the wall 15 tending to move the wall in a right hand direction with pressure being generated in the master cylinder bore 51, the two forces acting in opposed directions to compress the deformable force transmitting body 85 and thereby effect the bodily displacement against the face 88 of the member 35.

Figure 2:
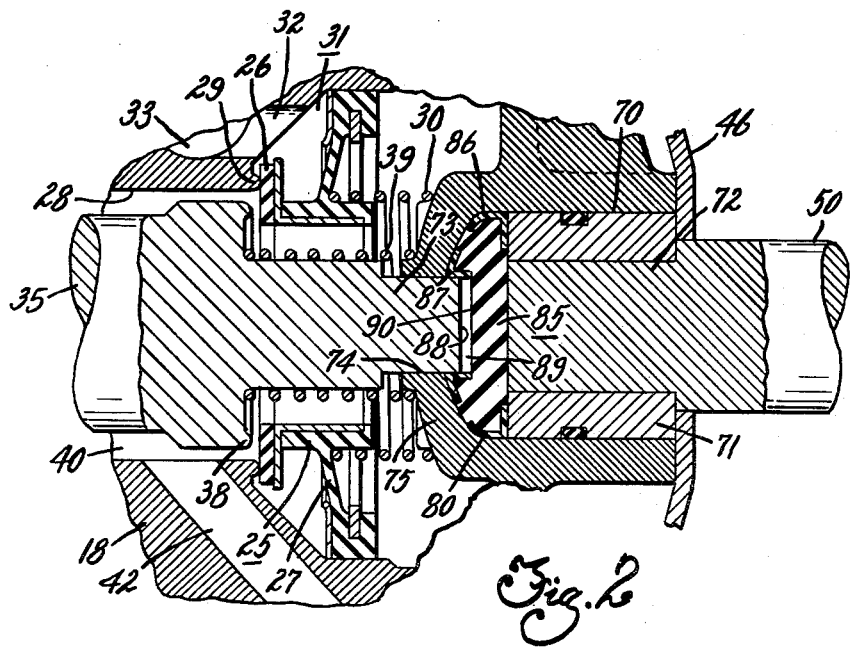
FIGURE 2 is an enlarged cross sectional view of the deformable force transmitting body that transmits reaction forces.

As more particularly shown in FIGURE 2, when the power brake booster is in the off position, that is when the brakes are released, the manually operated member 35 will have its forward end 73 in spaced relationship to the deformable body 85, a space or chamber 89 being thus provided between the face 88 and the face 90 of the member 85.

In operation of the power brake booster, the axial distance between the axial faces 88 and 90 is such that when the air valve 38 engages the valve member 26 and valve member 26 is barely raised off the vacuum seat 29, there will still be some clearance provided between the faces 88 and 90, thus the manual member 35 is moved forward against the action of spring 39 only during the period of time valve 26 is engaged by the air seat 38 and disengaged from the vacuum seat 29.

During this initial movement of the manual member 35, no reaction force is capable of being transmitted through the member 50 from the master cylinder since the return spring 45 holds the pressure responsive unit 15 in a stationary position shown in the drawing with the master cylinder bore being connected with the reservoir 56 through the port 65 in the manner heretofore described.

As soon as valve member 26 is raised from the vacuum seat 29, vacuum from chamber 31 will be admitted to chamber 14a of the booster by way of the annular chamber 40 and the passage 42, thereby creating pressure differential tending to move the pressure responsive unit 15 in a right hand direction. When this occurs power movement of the power transmitting member 50 will be caused in a right hand direction by means of the wall of the pressure responsive unit 15, the deformable force transmitting body 85 engaging the left hand end of the power transmitting member 50. Since at this moment the master cylinder chamber 51 is still connected with the reservoir 56 through the port 65, no pressure will be developed in the master cylinder and therefore no reaction force will be applied in a left hand direction against the displacement plunger 52 wth the result there will be no movement of the sleeve member 71 in the bore 70 and thus no compression of the rubber body 85.

However, as soon as the port 65 advances at least to the seal 60, pressure will then be developed in the master cylinder bore 51 with resultant reaction pressure on the displacement plunger 52 urging the displacement plunger 52 and the power transmitting member 50 in a left hand direction with the pressure responsive unit 15 still continuing in a right hand direction so as to compress the elastically deformable force transmitting body 85.

The initial compression of the body 85 will displace the body sufficiently to cause face 90 of the body 85 to engage face 88 on the manual control member 35. However, there has been sufficient delay time involved in the creation of this initial reaction that the pressure responsive unit 15 is under control of power with the result that power application is continuous in the brake application effort.

As the hydraulic pressure increases in the master cylinder 51, the body 85 will be additionally compressed with resultant additional displacement of the body 85 against the face 88 of the manual member 35 whereby the reaction forces are transmitted to the manual control member 35 in a ratio determined by the characteristics of the deformable body and the area of the face 88 relative to the cross sectional area of the power transmitting member consisting of the end 72 and the sleeve 71, these members transmitting the reaction force applied to the right hand end of the displacement plunger 52. These reaction forces will be transmitted to the pressure responsive unit and to the manual control member in a predetermined ratio as determined by the characteristics of the deformable body and the area of the face 88 to the area of the bore 70 in which the left hand end of the force transmitting member 50 is slidable.

Thus it will be seen that the initial reaction force, that is prior to the time of engagement of face 90 with face 88 is received by the pressure responsive unit 15, and thereafter a part of the reaction force in a predetermined ratio is transmitted to the manually operated member 35 to give the operator a predetermined brake feel.

While the member 85 has been described herein as a rubber member, it will be readily appreciated that the rubber member 85 is representative merely of a number of forms of material that will have deformation of the body of the material when the material is confined in a space and force is transmitted to the body, the body tending to displace itself through any suitable opening, which in this instance is the opening that receives the end 73 of the manual control member 35.

Figure 3:
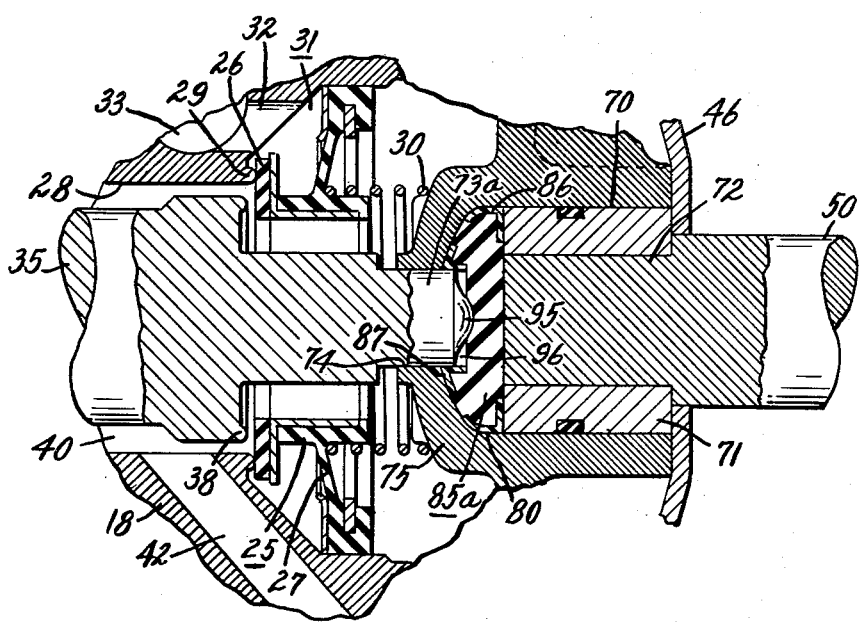
FIGURE 3 is an enlarged cross sectional view of a modified arrangement of the deformable force transmitting body and the manual member engaged thereby to provide for predetermined spaced relationship between the two members.

In FIGURE 3 there is illustrated a slightly modified arrangement of the manual member 73a relative to the deformable body 85a wherein a forward projection 95 is provided on the end 73a of the manual member to continuously engage the body 85a as illustrated in FIGURE 3, and deform and displace slightly a part of the body 85 so that when the manual member 35 is in the position illustrated in FIGURE 1, there will be a slight pressure on the member 35 tending to move the member 35 in a left hand direction and retain the air seat 35 disengaged from the valve element 36. Under this circumstance, the spring 39 can be eliminated from the assembly.

However, in operation of the device, when the modification of FIGURE 3 is used, the initial reaction force will be transmitted to the manual member 35 through the extension 95 since it is continuously engaging the member 85a. However, the initial reaction force transmitted will be only a small fraction of the reaction force to be transmitted since the extended end 95 still leaves the space 96 to be filled by deformation or displacement of the body 85a as a result of additional reaction force created at higher pressures existing in the master cylinder 51. Thus an initial reaction force can be transmitted to the manual member 35 with a subsequent increase of the reaction forces transmitted, the latter being in a predetermined ratio to that reaction force transmitted to the pressure responsive unit 15 in the manner hereinbefore described.

While the form of embodiment of the invention as herein disclosed constitutes a preferred form, it is to be understood that other forms might be adopted as may come within the scope of the claim which follows.

What is claimed is as follows:

A force applying mechanism, comprising, a fluid pressure operated motor having a pressure responsive unit therein, a force transmitting member operably connected with said pressure responsive unit effective for transmission of force from said pressure responsive unit and arranged to receive reaction force in proportion to the force exerted by the pressure responsive unit, an operator-operated control member, follow-up control valve mechanism actuated by the control member having a normal off position balancing pressures in said motor and being movable from said off position by actuation of said control member to establish differential pressures in said motor to move said pressure responsive unit thereby; a coherent generally solid elastically deformable force transmitting mass of predetermined volume confined in a space of substantially the same volume as defined by said force transmitting member and said pressure responsive unit and said control member, said force transmitting member and said pressure responsive unit being in force transmitting engagement therewith and said control member being normally spaced from but engageable therewith and when in engagement therewith said mass transmitting reaction forces from said force transmitting member to said pressure responsive unit and to said control member in a controlled ratio, and means positioning said control member and said mass when said mass is in a relaxed condition in said spaced relation thereby requiring an initial mass deformation by reaction force to engage said mass and said control member in reaction force transmitting relation whereby the said initial mass deformation effects withholding the transmission of initial reaction force to said control member.

References Cited in the file of this patent

UNITED STATES PATENTS

| | | |
|---|---|---|
| 2,395,223 | Ingres | Feb. 19, 1946 |
| 2,685,170 | Price | Aug. 3, 1954 |
| 2,690,740 | Hupp | Oct. 5, 1954 |
| 2,807,239 | Grant | Sept. 24, 1957 |
| 2,818,835 | Hupp | Jan. 7, 1958 |
| 2,832,316 | Ingres | Apr. 29, 1958 |